(12) United States Patent
Maher et al.

(10) Patent No.: US 10,604,433 B2
(45) Date of Patent: Mar. 31, 2020

(54) EMANCIPATIVE WASTE ACTIVATED SLUDGE STRIPPING TO REMOVE INTERNAL PHOSPHORUS ("EWASSTRIP")

(71) Applicant: Clean Water Services, Hillsboro, OR (US)

(72) Inventors: Chris Maher, Hillsboro, OR (US); Mike Gates, Hillsboro, OR (US); Robert Baur, Hillsboro, OR (US)

(73) Assignee: CLEAN WATER SERVICES, Hillsboro, OR (US)

( * ) Notice: Subject to any disclaimer, the term of this patent is extended or adjusted under 35 U.S.C. 154(b) by 0 days.

(21) Appl. No.: 16/169,844

(22) Filed: Oct. 24, 2018

(65) Prior Publication Data

US 2019/0119138 A1 Apr. 25, 2019

Related U.S. Application Data

(60) Provisional application No. 62/576,567, filed on Oct. 24, 2017.

(51) Int. Cl.
*C02F 11/04* (2006.01)
*C02F 11/12* (2019.01)
(Continued)

(52) U.S. Cl.
CPC ............ *C02F 11/04* (2013.01); *C02F 11/121* (2013.01); *C02F 11/127* (2013.01); *C02F 11/14* (2013.01);
(Continued)

(58) Field of Classification Search
CPC ....... C02F 11/04; C02F 11/121; C02F 11/127; C02F 2001/5218; C02F 2101/105; C02F 2301/08; C02F 11/14; C02F 2203/006
(Continued)

(56) References Cited

U.S. PATENT DOCUMENTS 5,360,546 A 11/1994 Tomita et al.
6,387,264 B1 * 5/2002 Baur ...................... C02F 3/006
210/601

(Continued)

FOREIGN PATENT DOCUMENTS

GB 2 228 930 12/1990
JP 07-88500 4/1995
(Continued)

OTHER PUBLICATIONS

Montag et al. (2007) A Feasible Approach of Integrating Phosphate Recovery as Struvite at Waste Water Treatment Plants; Proceedings, Institute of Environmental Engineering, pp. 551-558.
(Continued)

*Primary Examiner* — Fred Prince
(74) *Attorney, Agent, or Firm* — Paul B. Heynssens Attorney at Law, PLC

(57) ABSTRACT

A method of treating a mixture of microorganisms containing phosphorus and magnesium, by first inducing the mixture microorganisms to release phosphorus and magnesium. Next an emancipation or elutriation is performed. Phosphorus and magnesium-rich liquid is then tapped off as the mixture is thickened, to produce phosphorus and magnesium-rich liquid and phosphorus and magnesium-reduced treated mixture. This treated mixture is placed in an anaerobic digester where ammonia is formed but combines very little with phosphorus or magnesium as these elements have been reduced in concentration. Then the high-ammonia mixture is dewatered, to produce an ammonia-rich liquid, which is combined with the phosphorus and magnesium-rich liquid. In one preferred example a useable struvite product is harvested from this combination. Additionally, the production of nuisance struvite in the anaerobic digester is reduced, in comparison with prior art waste treatment methods.

20 Claims, 15 Drawing Sheets

(51) Int. Cl.
*C02F 11/14* (2019.01)
*C02F 11/127* (2019.01)
*C02F 11/121* (2019.01)
C02F 101/10 (2006.01)
C02F 1/52 (2006.01)

(52) U.S. Cl.
CPC ............... *C02F 2001/5218* (2013.01); *C02F 2101/105* (2013.01); *C02F 2203/006* (2013.01); *C02F 2301/08* (2013.01)

(58) Field of Classification Search
USPC .............. 210/603, 609, 613, 903, 906
See application file for complete search history.

(56) References Cited

U.S. PATENT DOCUMENTS

| | | | |
|---|---|---|---|
| 6,464,875 | B1 | 10/2002 | Woodruff |
| 6,663,777 | B2 | 12/2003 | Schimel |
| 6,706,185 | B2 | 3/2004 | Goel et al. |
| 6,776,816 | B1 | 8/2004 | Ringelberg et al. |
| 7,264,715 | B2 | 9/2007 | Hagino et al. |
| 7,604,740 | B2 | 10/2009 | Baur |
| 8,445,259 | B2 * | 5/2013 | Kang ............. C02F 9/00 435/262 |
| 2001/0045390 | A1 | 11/2001 | Kim et al. |
| 2003/0172697 | A1 | 9/2003 | Sower |
| 2003/0217968 | A1 | 11/2003 | Goel et al. |
| 2006/0124541 | A1 | 6/2006 | Logan et al. |
| 2007/0000836 | A1 | 1/2007 | Elefritz |
| 2007/0209998 | A1 | 9/2007 | Abu-Orf |
| 2009/0194476 | A1 * | 8/2009 | Baur ............. C02F 1/5254 210/603 |
| 2010/0170845 | A1 | 7/2010 | Baur |
| 2013/0196403 | A1 * | 8/2013 | Bowers ........... C02F 1/5254 435/168 |
| 2014/0147910 | A1 * | 5/2014 | Bowers ........... C02F 1/5254 435/262 |

FOREIGN PATENT DOCUMENTS

| | | |
|---|---|---|
| JP | 09-262599 | 10/1997 |
| JP | 2003-334584 | 11/2003 |
| JP | 2004-160343 | 10/2004 |
| JP | 2005-161158 | 6/2005 |

OTHER PUBLICATIONS

Rensink et al. (1997), "The Modified Renphosystem: A High Biological Nutrient Removal System," Wat. Sci. Tech., 35 (10):137-146.

Usepa (1987), "Phosphorus Removal," Design Manual No. EPA/625/1-87/001, Center for Environmental Research Information, Cincinnati, OH, Chapter 3.

Droste, (1997) Theory and practice of water and wastewater treatment, John Wiley & Sons, Inc. NY, pp. 589-591.

* cited by examiner

EMANCIPATIVE WASTE ACTIVATED SLUDGE STRIPPING TO REMOVE INTERNAL PHOSPHORUS ("EWASSTRIP")

CROSS-REFERENCE TO RELATED APPLICATION

This application claims the benefit of U.S. Provisional Application No. 62/576,567, filed on Oct. 24, 2017, which is incorporated herein by reference.

TECHNICAL FIELD

This description relates generally to waste water treatment and more specifically to processes to recover phosphorus as struvite and/or to prevent downstream struvite build up.

BACKGROUND

It is often required to remove phosphorous content from waste water to protect waterways from nutrient pollution. However, the removal process, especially enhanced biological phosphorous removal ("EBPR"), can cause problems in a waste water treatment facility in the formation of struvite (struvite or equivalently magnesium ammonium phosphate is a phosphorus mineral with formula: $NH_4MgPO_4.6H_2O$ that tends to clog pipes, pumps, and tanks used in the treatment process). Waste water treatment is typically performed in stages. In a primary stage treatment waste water may be held so that heavier particles can settle and floating materials can be removed. Secondary treatment may remove dissolved and suspended biological matter.

As part of a typical secondary waste water treatment, primary treated waste water may be processed with air or pure oxygen. In this "activated sludge" process, microorganisms utilize the oxygen to metabolize the incoming waste water, forming a mixture of microorganisms and waste water known as "mixed liquor." This mixture is moved to settling tanks for concentration, thereby forming concentrated activated sludge. A majority of this sludge is returned to the activated sludge process tankage as "return activated sludge" (RAS). A separate portion of this sludge, termed "waste activated sludge" (WAS), is removed from the activated sludge process and sent to a sludge handling system for further treatment and disposal.

From this point on a variety of subsequent processes have been employed to further process the waste water, particularly with regards to removing nutrients, such as phosphorus. These processes can be chemical or biological or a combination of the two. However in typical systems it is a challenge to remove phosphorous early in the sludge handling processes to prevent deleterious downstream struvite formation.

Accordingly it would be desirable to create a process for struvite recovery that tends to reduce or eliminate the need for the addition of magnesium, as well as removing magnesium early in the process so that clogging by struvite tends to be minimized.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a method of treating a first mixture of waste solids and microorganisms containing phosphorus and magnesium, by first inducing the mixture of microorganisms to release phosphorus and magnesium in an anaerobic reactor, which is then tapped off as the mixture is thickened, to produce phosphorus and magnesium-rich liquid and phosphorus and magnesium-reduced sludge. This phosphorus and magnesium-reduced sludge is placed in an anaerobic digester where ammonia is formed, but combines very little with the phosphorus or magnesium (to form struvite) as these elements have been reduced in concentration. The sludge, now high in ammonia, is dewatered, to produce an ammonia-rich liquid, which is combined with the phosphorus and magnesium-rich liquid. In one example a useable struvite product is harvested from this combination. Additionally, the production of nuisance struvite in the anaerobic digester is greatly reduced, in comparison with prior art waste treatment methods.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a phosphorous and magnesium removal system. Although the present examples are described and illustrated herein as being implemented in an activated sludge system, the system described is provided as an example and not a limitation. As those skilled in the art will appreciate, the present examples are suitable for application in a variety of different types of waste water treatment systems.

The first example described below describes a process of elutriation. However, the invention is in its broadest sense, providing any process which emancipates soluble material from the sludge particles between the Release and solid liquid separation ("Thickening") steps. First a process of elutriation using the liquid from the solid liquid separation ("Thickening") process will be described. However, liberating soluble material from the sludge particles between the Release and Thickening steps can be accomplished via multiple methods, but what is new and of particular note is adding this step prior to the solid liquid separation "Thickening" step to liberate more of the phosphorus and magnesium before it is thickened before anaerobic digestion.

In the following paragraphs the following abbreviations may be used: "WAS" for waste activated sludge; TWAS for thickened waste activated sludge; STWAS for stripped thickened waste activated sludge; TTWAS for twice thickened waste activated sludge; WASSTRIP for waste activated sludge stripping to remove internal phosphorus.

Figure 1:
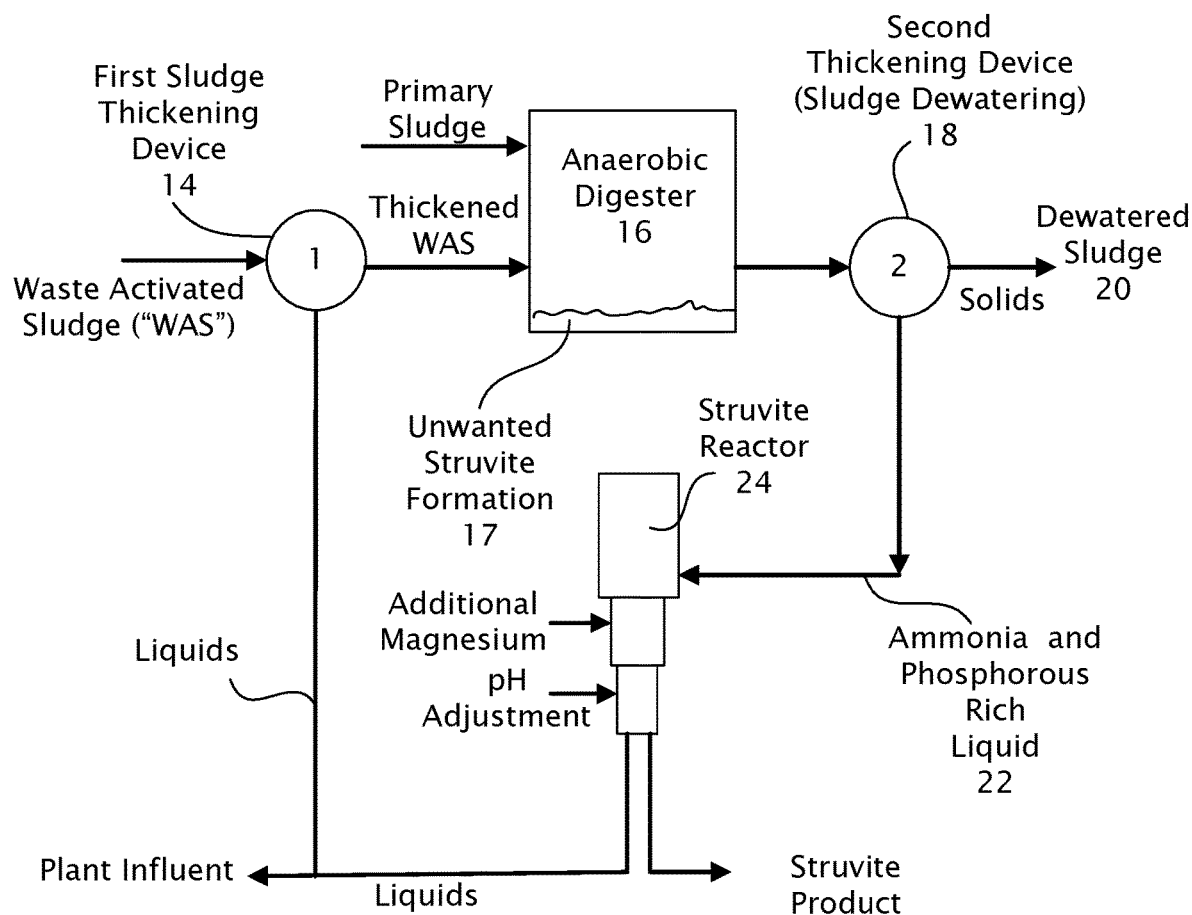
FIG. 1 is a process flow diagram of a conventional waste treatment system prone to struvite blockages.

FIG. 1 is a process flow diagram of a conventional waste treatment system 10 prone to struvite blockages. In this conventional configuration 10, the WAS is sent to a centrifuge (or other thickening apparatus) 14 for thickening, the liquids are tapped off and returned to the wastewater plant for treatment, whereas the resultant thickened sludge is sent to an anaerobic digester 16 with other sludges.

Next the digester output is sent to a second centrifuge (or other dewatering apparatus) 18 for dewatering. Unfortunately, struvite tends to form 17 in digester 16, and other equipment downstream because the ammonia, magnesium, and phosphorus that are present can precipitate as struvite. This struvite is impractical to harvest and also has the deleterious effect of being deposited on surfaces in the reactor 16 and plugging pipes and equipment downstream of the anaerobic digester.

A second centrifuge (or other dewatering apparatus) 18 produces further dewatered sludge 20, which is either beneficially reused as biosolids or otherwise disposed of, and liquids 22, which are rich in ammonia and phosphorus. It has been learned that struvite can be harvested from liquids 22, by a struvite reactor 24. Unfortunately, the struvite harvest requires the addition of magnesium into the process, which adds costs to the process.

Figure 2:
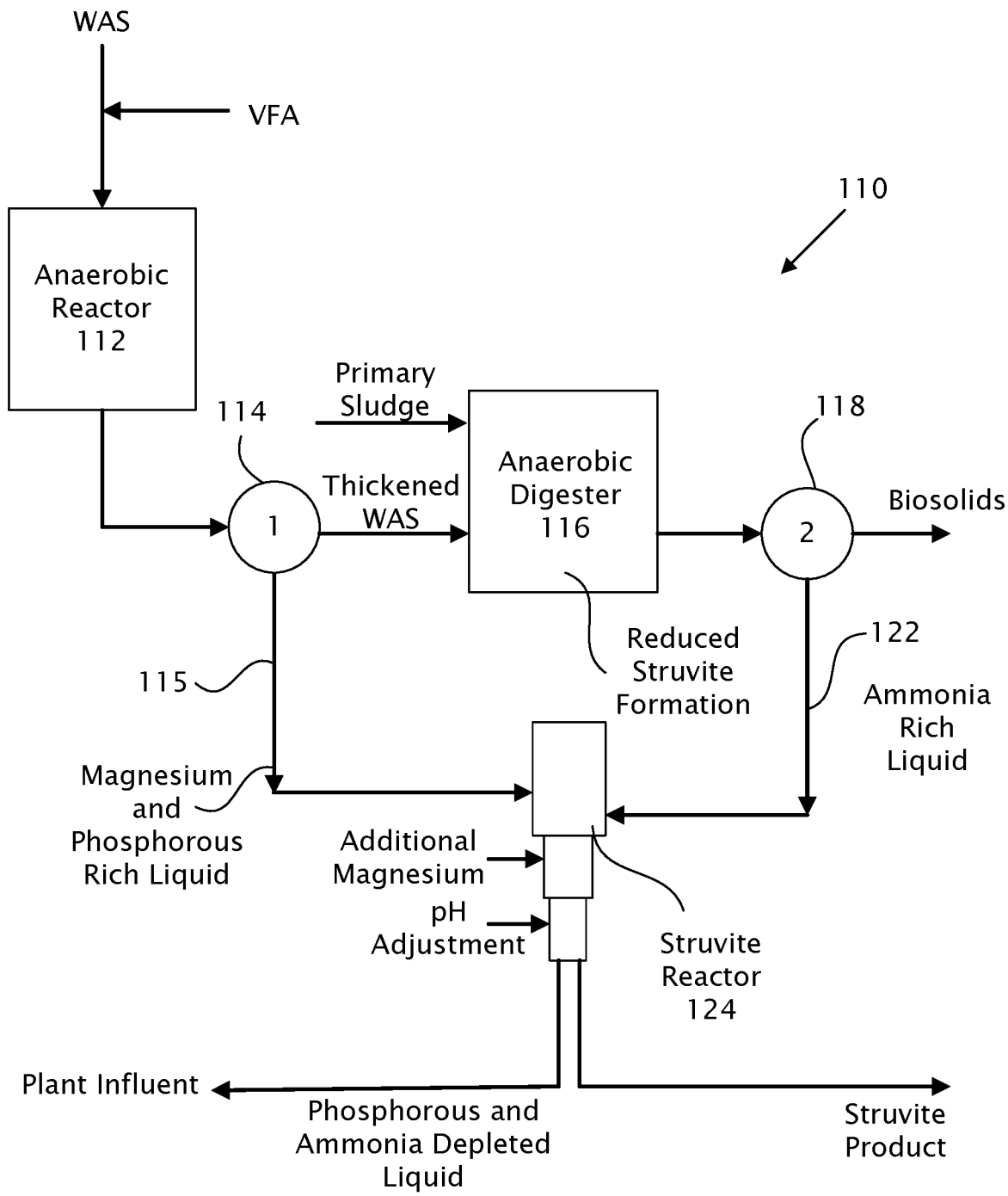
FIG. 2 is a process flow diagram of a process for early removal of phosphorous and magnesium to aid in recovering phosphorus as struvite and/or preventing struvite formation in waste water treatment facilities by using an anaerobic reactor upstream of anaerobic digestion to release phosphorus and magnesium.

FIG. 2 is a process flow diagram of a process for early removal of phosphorous to aid in preventing struvite formation in the solids processing portion of the waste water treatment facilities by using an anaerobic reactor 112. WAS is input into an anaerobic reactor 112. Output of the anaerobic reactor 112 is input to a thickening device 114.

In the anaerobic reactor 112 VFAs can be added from an external source to increase the rate of release or can also be from an internal source through fermentation of the WAS under adequately designed detention times and temperatures. The release of phosphorous and magnesium can be caused ("induced") by physically adding RBC's, such as one or more VFA's, or can be caused by generating the requisite reaction conditions to cause ("induce") endogenous respiration and fermentation to bring about the release of phosphorous and magnesium.

Without addition of the VFAs, the activated sludge is held for a first exemplary period of 36 to 96 hours, for endogenous respiration and fermentation to release phosphorus and magnesium. In a second alternative example a hold time of substantially 24 hours is contemplated for the endogenous mixture. In alternative examples other holding periods may be contemplated as known to those skilled in the art.

Inducing a mixture of microorganisms to release phosphorus and magnesium cannot be done by storage of the WAS alone under anaerobic conditions. In addition to anaerobic conditions, soluble phosphorus release typically requires presence of VFAs, by either the external addition of VFAs or the internal production of VFAs through fermentation of the WAS biomass as described below.

Anaerobic conditions must be maintained along with the presence of VFAs for the phosphorus accumulating organisms (PAOs) to release soluble phosphorus. Storage under anaerobic conditions for sufficient time can allow for the fermentation of the WAS solids to internally produce VFAs, with the required time for release is dependent on the temperature of the stream as will be appreciated by those skilled in the art. Elevated temperatures typically result in an increased fermentation rate.

The actual amount of time it takes to produce sufficient VFAs is temperature dependent and can take considerably longer than one day (24 hours), as shown by the data in Table 1 from Saskatoon where detention times there of up to 30 hours were determined not sufficient for phosphorus release to be substantially complete. What was not known at the time was that VFAs and anaerobic conditions are needed in addition to "storage" or reaction time in order for the phosphorus to be released. And if the VFAs are not added from an external source, then a long enough time to induce fermentation is required.

TABLE 1

PO4-P release from waste activated sludge under different temperature conditions and VFA sources at the Saskatoon H.M. Weir WWTP

| | Temp (deg C.) | | | | |
|---|---|---|---|---|---|
| | 10 | 12.5 | 15 | 17.5 | 20 |
| Anaerobic Hold Time (hr) | | PO4-P Release (mg/l) | | | |
| Endogenous WAS | | | | | |
| 0 | 0 | 0 | 0 | 0 | 0 |
| 8 | 10 | 13 | 19 | 20 | 20 |
| 24 | 29 | 41 | 57 | 70 | 78 |
| WAS + 400 mg/L Acetic Acid added | | | | | |
| 0 | 0 | 0 | 0 | 0 | 0 |
| 8 | 26 | 26 | 30 | 33 | 34 |
| 24 | 47 | 59 | 70 | 79 | 80 |
| 80% WAS + 20% Fermented primary sludge | | | | | |
| 0 | 4 | 4 | 4 | 4 | 4 |
| 8 | 41 | 43 | 48 | 51 | 51 |
| 24 | 84 | 96 | 100 | 103 | 104 |

One method for effecting the release of phosphorus and magnesium is by adding readily biodegradable carbon compounds (RBCs), such as volatile fatty acids (VFAs) to the sludge in the anaerobic reactor 112. In one example 5 to 8 grams of VFA may be added per gram of planned phosphorous release. In an alternative example 3 to 8 grams (and preferably 4-6 grams) of one or more VFAs may be added per gram of planned phosphorus release. In an alternative example RBCs may be generated from within the sludge.

Phosphorus and magnesium are released by microorganism action in the anaerobic reactor 112, where the WAS is held, typically for a minimum time of 0.5 hours with addition of VFAs. In alternative examples other holding periods may be contemplated as known to those skilled in the art.

The resultant WAS is sent to a thickening device 114, such as a centrifuge, thickening belt, gravity belt thickeners, rotating screens, or the like. The resultant liquids 115, having enhanced phosphorus and magnesium levels, are sent to at least one of a plurality of struvite reactors 124, which will be discussed further below. There is only very minimal struvite production in the liquids 115, because they have a very low ammonia level. VFAs or other forms of RBCs can be generated by fermentation as in the unified fermentation and thickening ("UFAT") process disclosed in UNIFIED FERMENTATION AND THICKENING PROCESS U.S. Pat. No. 6,387,264, issued May 14, 2002, the contents of which are incorporated herein by reference. Other methods of obtaining VFAs, include various fermentation methods, harvesting from various waste products, and purchase as industrial chemicals, such as acetic acid or the like.

The thickened WAS with reduced phosphorus and magnesium levels can be sent for disposal or for further solids processing such as an anaerobic digester 116, with other sludges where it is further treated by anaerobic bacteria which generate high concentrations of ammonia. The production of struvite in digester 116, is however, greatly reduced in comparison with the amount of struvite produced in digester 16 of the prior art system (which could be identical to digester 116) because of the reduction in phosphorus and magnesium in the thickened WAS, both of which are necessary for the formation of struvite. This reduction in struvite formation greatly reduces the formation of struvite deposits in the digester and pipes and equipment downstream from anaerobic digester 116.

The treated sludge from digester 116 is dewatered 118, by use of a centrifuge, dewatering belt, screen, plate and frame presses, etc. with the resultant dewatered solids being beneficially reused as biosolids or disposed. The ammonia-rich liquids 122, which are less able to make struvite in the associated pipes and equipment because of the reduced phosphorus and magnesium, are sent to struvite reactor 124, where the abundant ammonia or ammonia from other sources combines with the phosphorus and magnesium of the liquids 115 to form struvite. This type of system is more fully described in WASTE ACTIVATED SLUDGE STRIPPING TO REMOVE INTERNAL PHOSPHORUS U.S. Pat. No. 7,604,740, issued Oct. 20, 2009, the contents of which are incorporated herein by reference. And in, A WASTE ACTIVATED SLUDGE PHOSPHORUS AND MAGNESIUM STRIPPING PROCESS AND STRUVITE PRODUCTION SYSTEM U.S. Pat. No. 8,496,827, issued Jul. 30, 2013, the contents of which are incorporated herein by reference.

While the above system is effective in preventing unwanted struvite formation in the treatment plant, there can be difficulties in processing the STWAS, as previously described. Accordingly the improved systems described below emancipates soluble material from the sludge particles between the Anaerobic Reactor 112 and the solid liquid separation step 114. This may be done by elutriation using the liquid from the solid liquid separation process (thickening process). This may also be accomplished via multiple methods, but what is unique in each case is adding this step prior to the final solid liquid separation step to emancipate more of the phosphorus and magnesium before the liquid is recovered.

Figure 3:
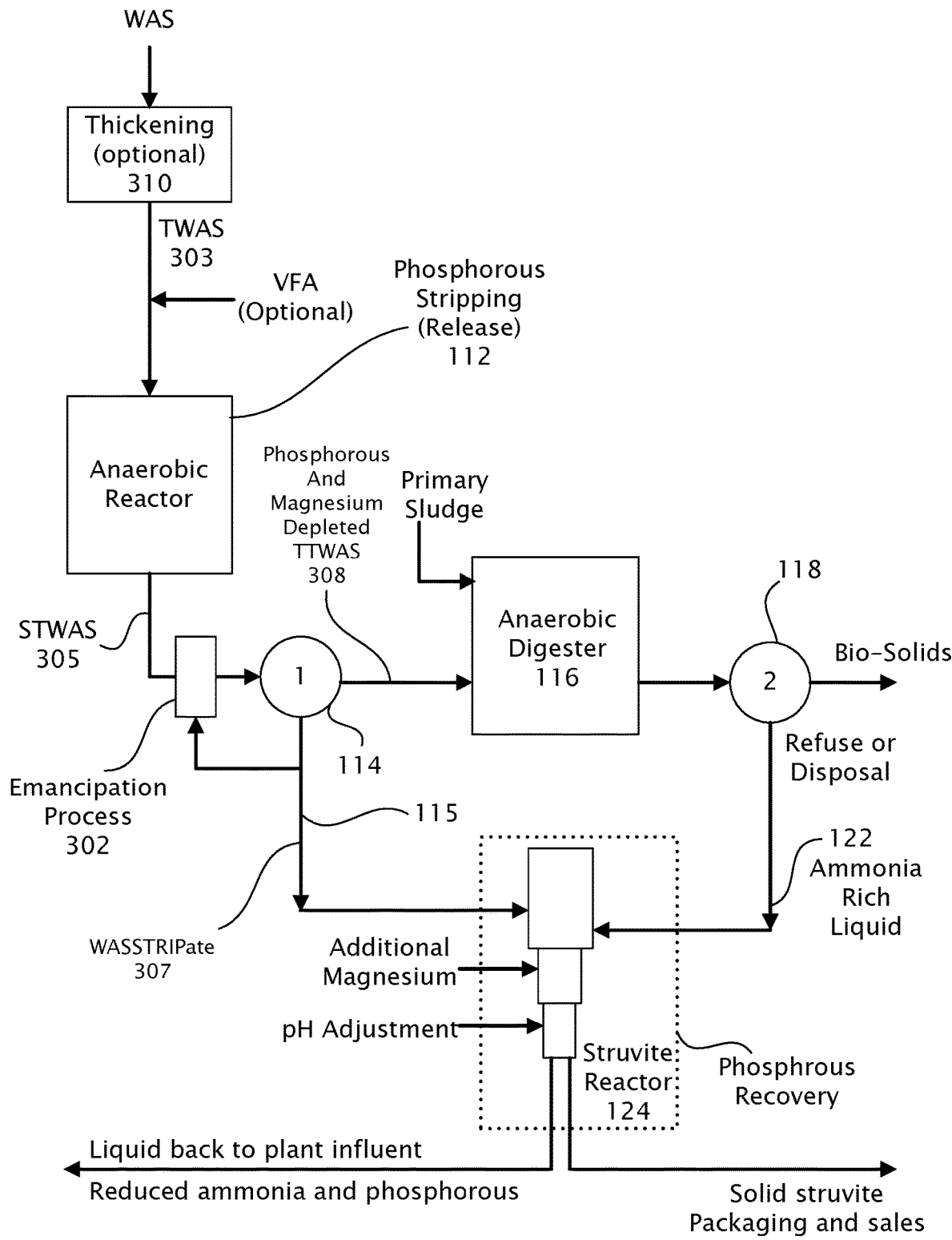
FIG. 3 is a process flow diagram of an emancipating process that subjects the sludge to any type or form of force, energy, chemical agent that has the effect of liberating soluble material from the sludge particles to increase the amount of phosphorus and magnesium removed, defined as the Emancipative Waste Activated Sludge Stripping to Remove Internal Phosphorus ("eWASSTRIP") process.

FIG. 3 is a process flow diagram of an emancipative Waste Activated Sludge Stripping to Remove Internal Phosphorus ("eWASSTRIP") system. The process is as previously described in relation to FIG. 2, with the addition of an emancipation process 302 added between the Anaerobic Reactor (or release tank) 112 output and the input to the second thickening stage 114.

WAS may be applied to an optional thickening process 310 prior to create TWAS 303, to which VFAs may optionally be added.

If the optional additional thickening is not performed, Waste Activated Sludge ("WAS") is input from an EBPR process into a conventionally constructed thickening device 114. There the WAS is thickened from approximately 1% total solids to approximately 3% total solids.

This thickened WAS (TWAS) 303 is held in a complete mix anaerobic reactor (phosphorus stripping/release tank) 116. In the anaerobic condition fermenting bacteria can break down organic matter into volatile fatty acids (VFA).

VFAs are utilized by phosphorus accumulating organisms (PAO) to produce polyhydroxybutyrate (PHB). The energy for this conversion comes from breaking polyphosphate bonds and phosphorus is then released through the cell membrane. To maintain charge neutrality cations including magnesium are also released from the cell.

The STWAS 305 is processed in a solid liquid separation system 114 to recover the liquid containing elevated concentrations of phosphorus and magnesium (emancipated STWAS). The resultant solid material output is accordingly reduced in concentration of phosphorus and magnesium. This solid material can be processed in an anaerobic digester where bacterial action produces high ammonia concentrations, however the reduction in phosphorus and magnesium limits the formation of struvite in the anaerobic digester.

The output of the anaerobic digester is also processed in a solid liquid separation system 118 to produce a dewatered biosolids product and a liquid stream rich in ammonia. This liquid stream is combined with the phosphorus and magnesium rich liquid recovered from the STWAS in a struvite reactor 124 to produce struvite.

The present invention proposes increasing the recovery of phosphorus and magnesium from the STWAS by application of an emancipating process—addition of a recycle flow of the recovered liquid, addition of another liquid stream, addition of energy by a mechanical mixer, through lysing, or any combination thereof or of other processes that facilitates the movement of the soluble phosphorus and magnesium into the bulk water.

The stripped TWAS ("STWAS") 305 output from the anaerobic reactor 112 is again thickened and the resulting residual liquor ("WASSTRIPate") 307 is now enriched with phosphorus and magnesium. This liquor can be used in phosphorus recovery processes.

The phosphorus and magnesium depleted twice thickened WAS ("TTWAS") 308 output from the second thickener 114 can be anaerobically digested with a reduced potential for struvite formation in the digester and dewatering equipment.

There can be a problem with the second thickening step. It is difficult to effectively mix thickening polymer into the STWAS 305. Additionally, the volume reduction required to have a reasonably sized phosphorus stripping tank results in low hydraulic loading rates and high solids loading rates to the thickening equipment in the second thickening step. The STWAS can be diluted with liquids (such as pressurized plant effluent, city water, the ammonia rich liquid 122, a chemical mixture or the like) prior to polymer addition to mitigate this problem, however the WASSTRIPate becomes diluted and the total volume of WASSTRIPate to handle increases. It may be beneficial to utilize or create a fluid stream from within the process.

An internal recycle stream of WASSTRIPate is introduced into the STWAS prior to the second thickening step in order to dilute the total solids concentration for more effective thickening without diluting the phosphorus and magnesium concentrations or increasing the total volume of WASSTRIPate.

Phosphorus and magnesium recovery rates can be improved through emancipation of the STWAS. This emancipation is accomplished in three ways.
1) Applying shear forces to shear floc (a loosely clumped mass of fine particles). Floc size is reduced thus reducing the length term in the flux of phosphorus and magnesium from the floc interior to the bulk water.
2) Concentration gradient. A concentration gradient exists from the floc interior (high concentration) to the bulk water (low concentration) due to resistance to diffusion through the floc structure. Flux rate is increased by increasing the gradient. The concentration gradient can be controlled by the addition of internal or external elutriation liquids such as a WASSTRIPate recycle stream.
3) Time. Because flux is a mass per unit area per unit time, the detention time between emancipation and solid liquid separation can be optimized.

Another benefit of elutriation with an internal recycle flow of WASSTRIPate is that hydraulic loading to the reactors is reduced due to a reduction in WASSTRIPate volume. Also chemical savings in the reactors may be obtained: Magnesium reduction from better magnesium recovery, and Sodium Hydroxide reduction from reduced volume of WASSTRIPate. And a final advantage is the control of WASSTRIPate phosphorus concentration by not diluting with another liquid.

Regarding the effectiveness of elutriation, the sludge produced from an activated sludge system is capable of biological phosphorus removal through the luxury uptake of phosphorus by the group of bacteria known as phosphorus accumulating organisms and is treated through the WASSTRIP process. This excess sludge may or may not be thickened before retention in an anaerobic release tank 112. While in residence in the anaerobic release tank 112, soluble material is released from bacterial cells through various mechanisms. In total these mechanisms are referred to as stripping. Included in the soluble material is magnesium and phosphorus which is valuable in the production of struvite. The soluble material released by the cell enters the aqueous phase and can be held in the liquid that is bound to the surface of the sludge particle, held by capillary action in the interstitial spaces of the sludge particle, bound internal to the cell, or in solution in the free (bulk) water. In short there may be some bonding or adherence of magnesium and phosphorous to sludge particles after phosphorous stripping in the anaerobic reactor 112, as well as the magnesium and phosphorous being in solution. It may be desirable to further emancipate phosphorous and magnesium that tends to adhere to sludge particles.

To aid in further release of phosphorous and magnesium the mixture that is the output of the anaerobic release tank 112 is followed by an emancipation process 302 or the like that subjects the mixture to any type or form of force, energy, or chemical agent that has the effect of emancipating soluble material from the sludge particle.

Figure 4:
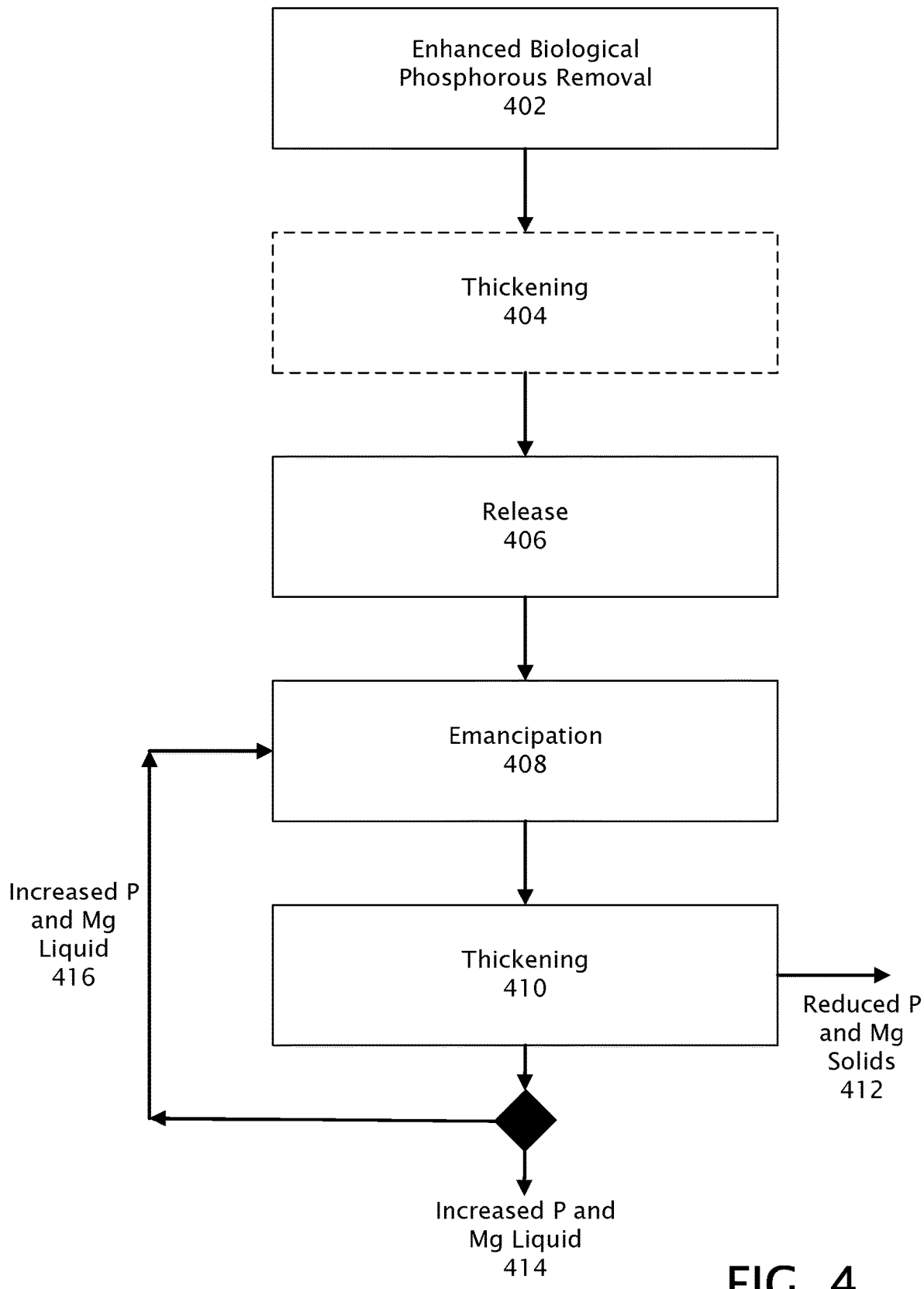
FIG. 4 is a process flow diagram of the first example of eWASSTRIP utilizing elutriation with filtrate from the thickening process.

FIG. 4 is a block diagram of the first example of eWASSTRIP utilizing WASSSTRIPate for elutriation. The enhanced biological removal of phosphorous is carried out in block 402. At block 404 a thickening step can be carried out. At block 406 release is carried out. At block 408 elutriation is carried out. At block 410 a second thickening is carried out. The result of thickening 410 is that an output of reduced potassium and magnesium solids 412 is produced as well as increased phosphorous and magnesium liquid 414 is produced.

The emancipative process is accomplished through elutriation by a recycle flow 416 of the liquid output of the solid liquid separation process (thickening), where the recycle flow is added after the release process and before the thickening process, to assist in the emancipation of soluble material from the sludge particle.

Figure 5:
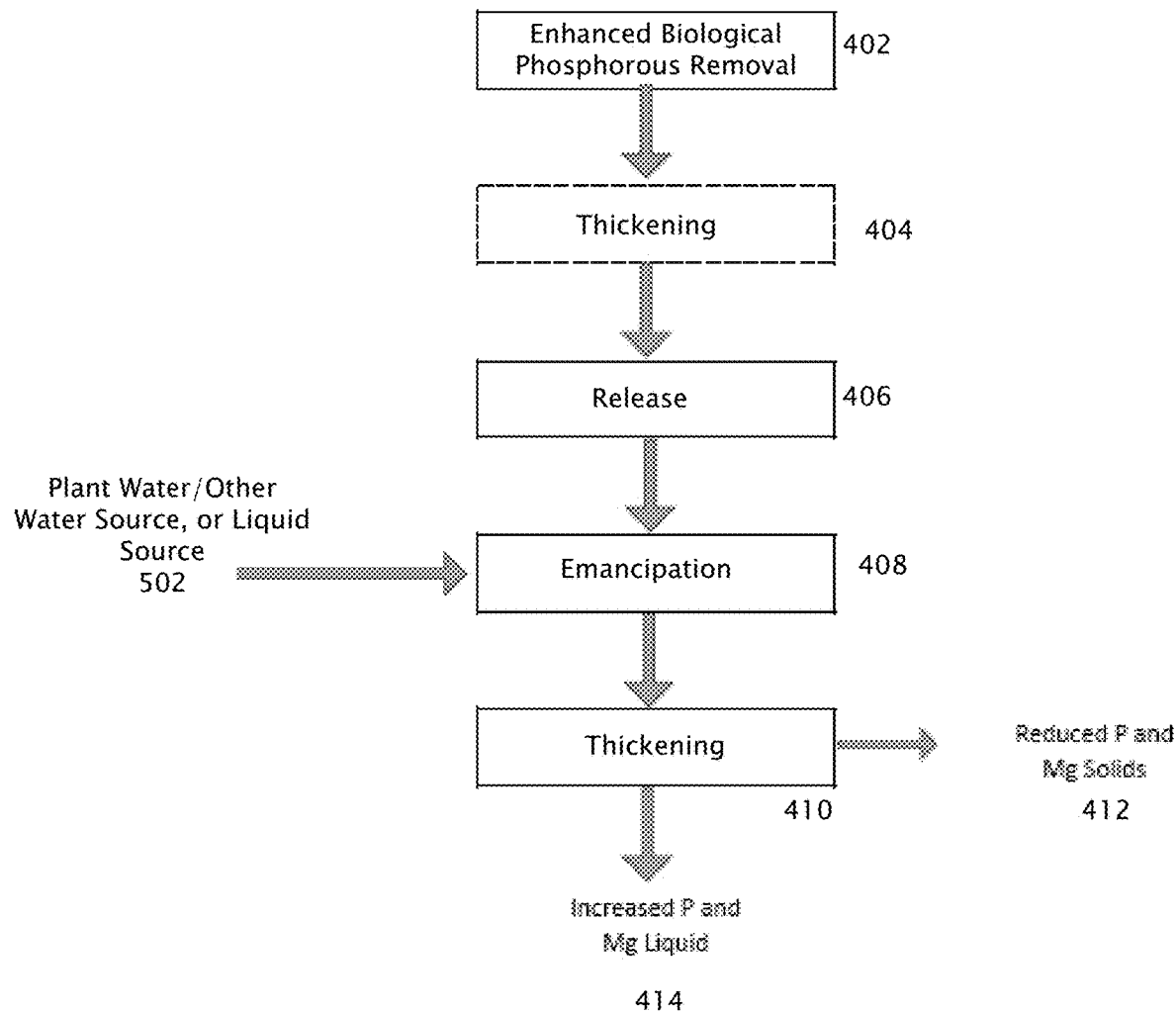
FIG. 5 is a process flow diagram of the second example of eWASSTRIP utilizing elutriation with plant water or any other source of water or liquid.

FIG. 5 is a block diagram of the second example of eWASSTRIP utilizing plant water, other source water or liquid for elutriation. The process steps 402, 404, 406, 410 are the same as previously described in FIG. 4. Elutriation also occurs at block 408 but with the added process of adding plant water or other source water or liquid 502.

The emancipative process is accomplished through elutriation by an external flow of liquid 502, such as plant water, where the external flow is added after the release process and before the thickening process, to assist in the emancipation of soluble material from the sludge particle.

Figure 6:
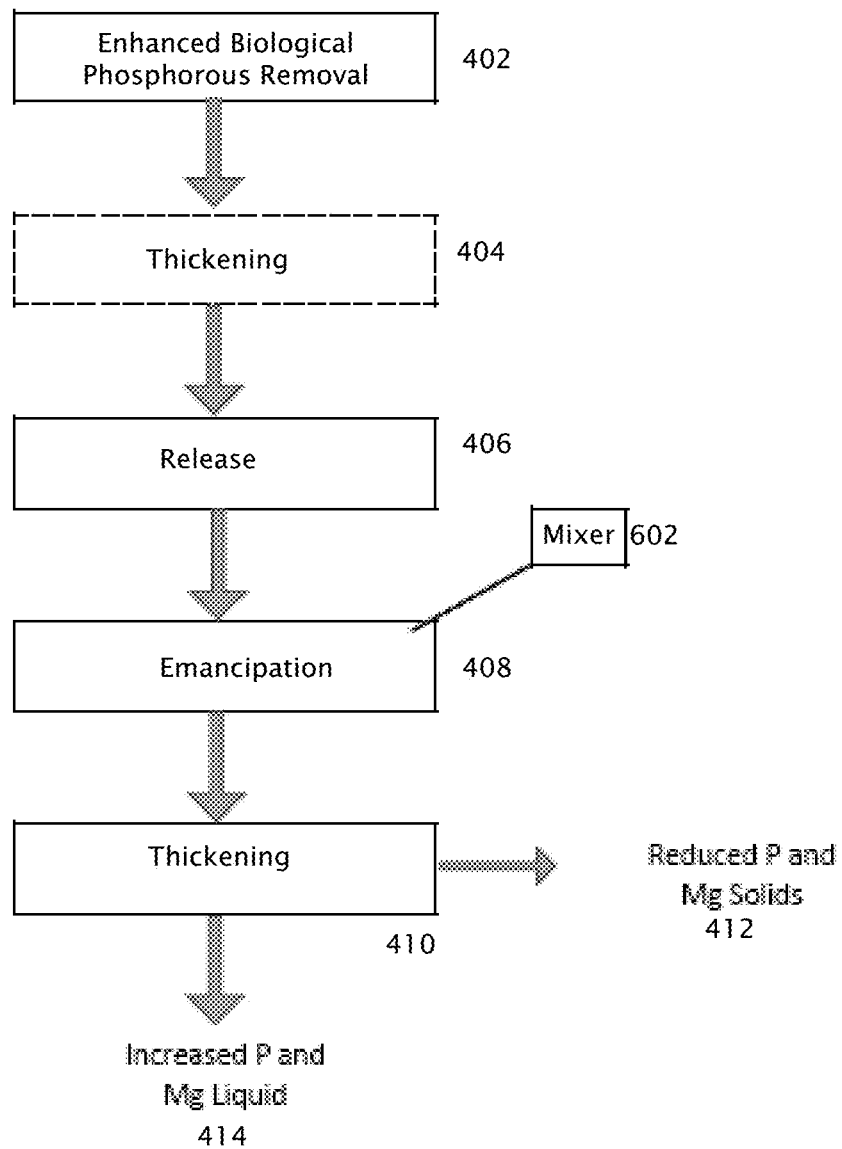
FIG. 6 is a process flow diagram of a third example of eWASSTRIP utilizing a mixer to add mechanical energy.

FIG. 6 is a block diagram of a third example of eWASSTRIP utilizing a mixer for emancipation. The process steps 402, 404, 406, 410 are the same as previously described in FIG. 4. Emancipation also occurs at block 408 but with the added process of mixing 602 to apply shear forces being added to aid in emancipation.

The emancipative process is accomplished through adding energy by mechanical mixing 602, where the mixer is installed after the release process and before the thickening process, to assist in the emancipation of soluble material from the sludge particle.

Figure 7:
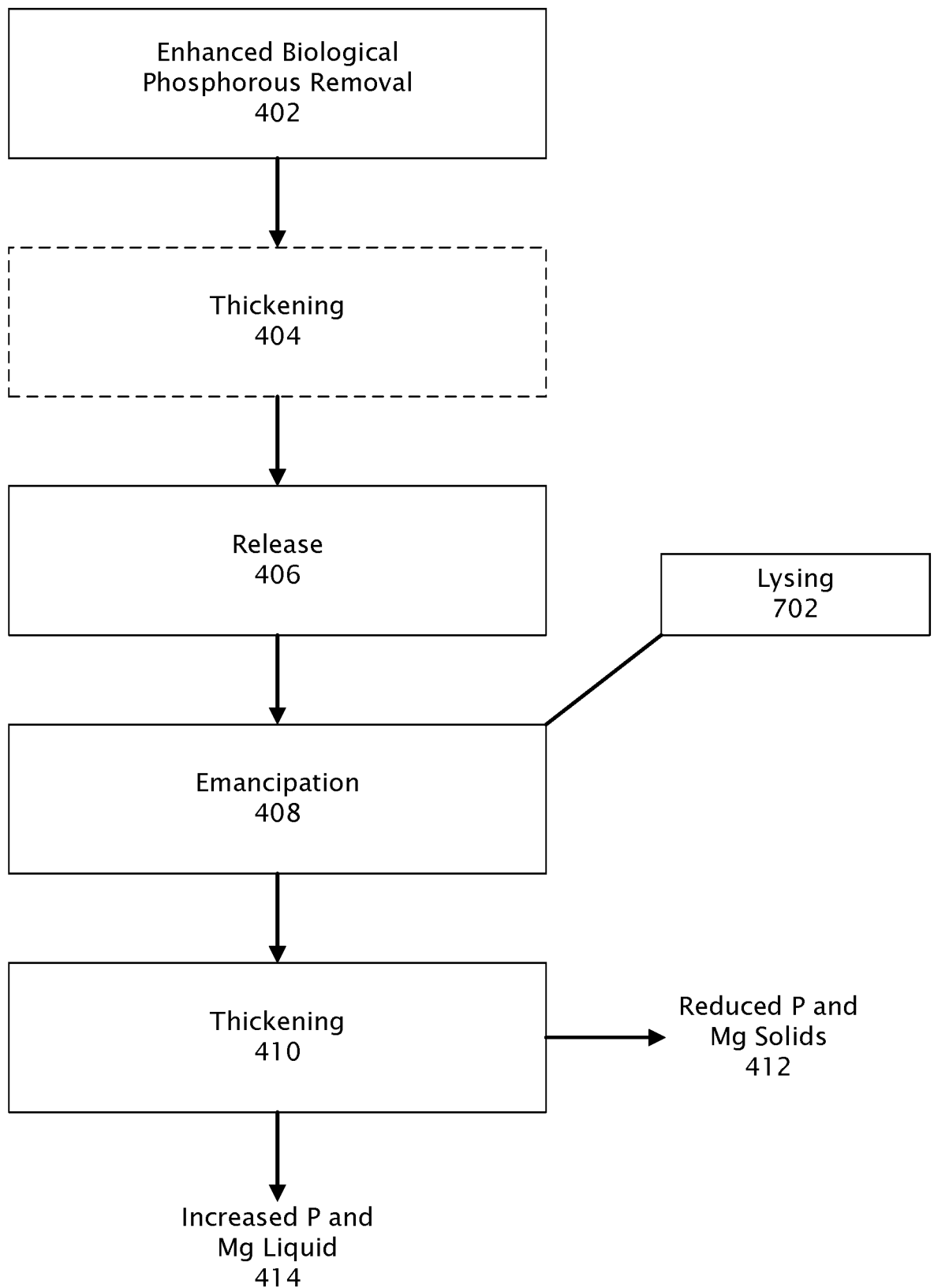
FIG. 7 is a process flow diagram of a fourth example of eWASSTRIP utilizing any method of lysing the sludge.

FIG. 7 is a block diagram of a fourth example of eWAS-STRIP utilizing lysing for emancipation.

The process steps 402, 404, 406, 410 are the same as previously described in FIG. 4. emancipation also occurs at block 408 but with the added process of lysing 702 being added to aid in emancipation.

In this example the emancipative process is accomplished through a lysing process (dissolution or destruction of cells by disruption of the cell membrane) 702, by adding chemicals, ultrasonic energy, or other means, in a location after the release process and before the thickening process, to assist in the emancipation of soluble material from the sludge particle which includes the bacterial cells.

Figure 8:
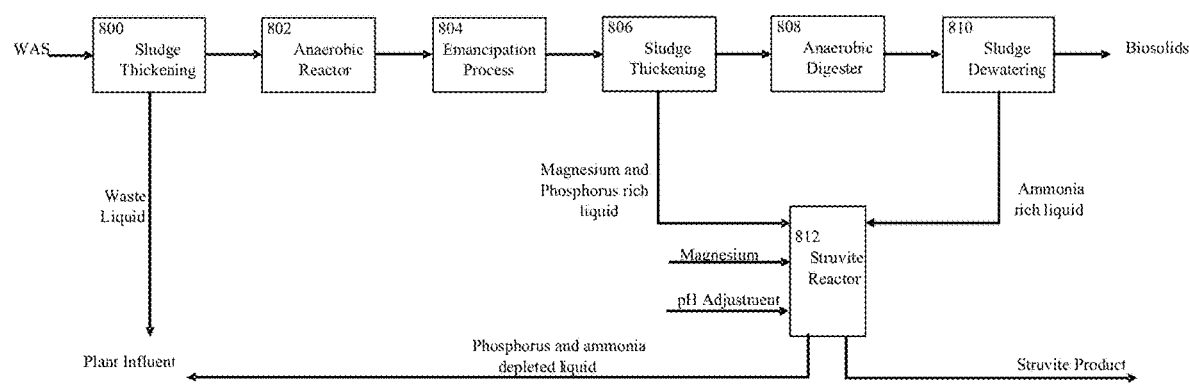
FIG. 8 is a block diagram for eWASSTRIP with an emancipative process step between the anaerobic reactor and sludge thickening step.

FIG. 8 is a block diagram of a system including an emancipation process 804. WAS enters a sludge thickening device 800, which includes two outputs, a first sludge thickening device output is waste liquid, and a second sludge thickening device output is thickened WAS which is fed into an anaerobic reactor 802. Anaerobic reactor 802 output is fed into an emancipation process 804. Emancipation process 804 has an output fed into a sludge thickening device 806. The first output of sludge thickening device 806 is coupled to an anaerobic digester 808. The second output of sludge thickening device 806 is coupled to struvite reactor 812. The output of anaerobic digester 808 is coupled to sludge dewatering device 810. The first output of sludge dewatering device 810 is coupled to struvite reactor 812. A second output of sludge dewatering device 810 is biosolids. Struvite reactor 812 has further available inputs of magnesium, and pH adjustment. Struvite reactor 812 has outputs of struvite product and phosphorous and ammonia depleted liquid.

Sludge thickening device 800 is conventionally constructed.

Anaerobic Reactor 802 is conventionally constructed.

Emancipation process 804 is conventionally constructed.

Sludge thickening device 806 is conventionally constructed.

Anaerobic Digester 808 is conventionally constructed.

Sludge dewatering 810 is conventionally constructed.

Struvite reactor 812 is conventionally constructed.

Figure 9:
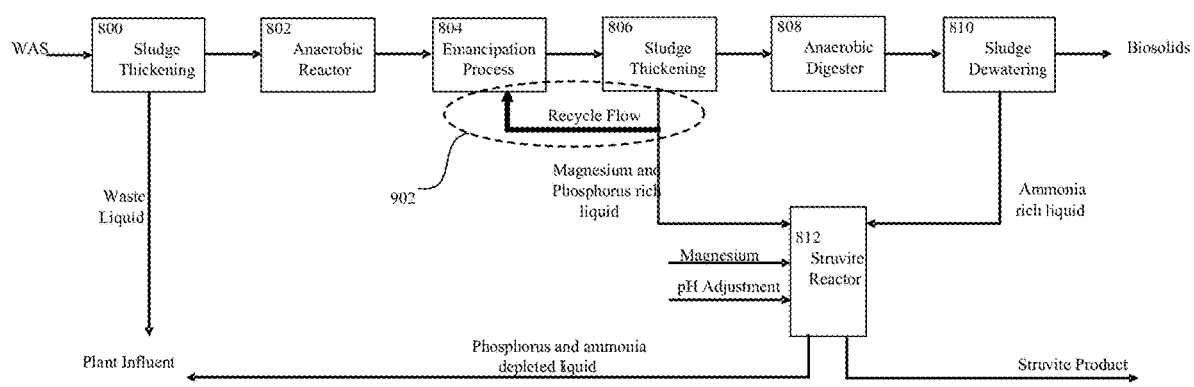
FIG. 9 is a block diagram of a first example of eWASSTRIP utilizing elutriation with filtrate from the thickening process.

FIG. 9 is a block diagram of a first alternative example of a system including an emancipation process. This example shares the construction described in FIG. 8 with the addition of a recycle flow 902 being coupled from the sludge thickening block back (magnesium and phosphorus rich liquid output) to the emancipation process 804

Figure 10:
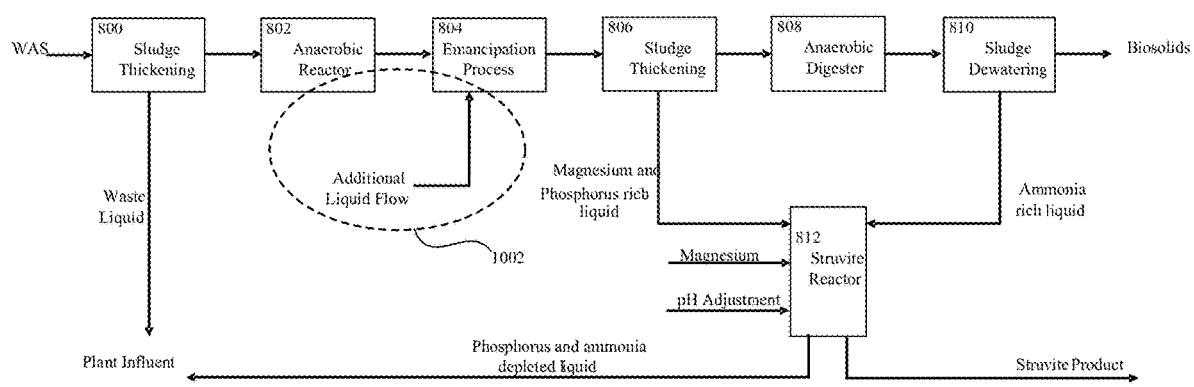
FIG. 10 is a block diagram of a second example of eWASSTRIP utilizing elutriation with plant water or any other of water or liquid.

FIG. 10 is a block diagram of a second alternative example of a system including an emancipation process. This example shares the construction described in FIG. 8 with the addition 1002 of an additional liquid flow 1002 being input to the emancipation process 804.

Figure 11:
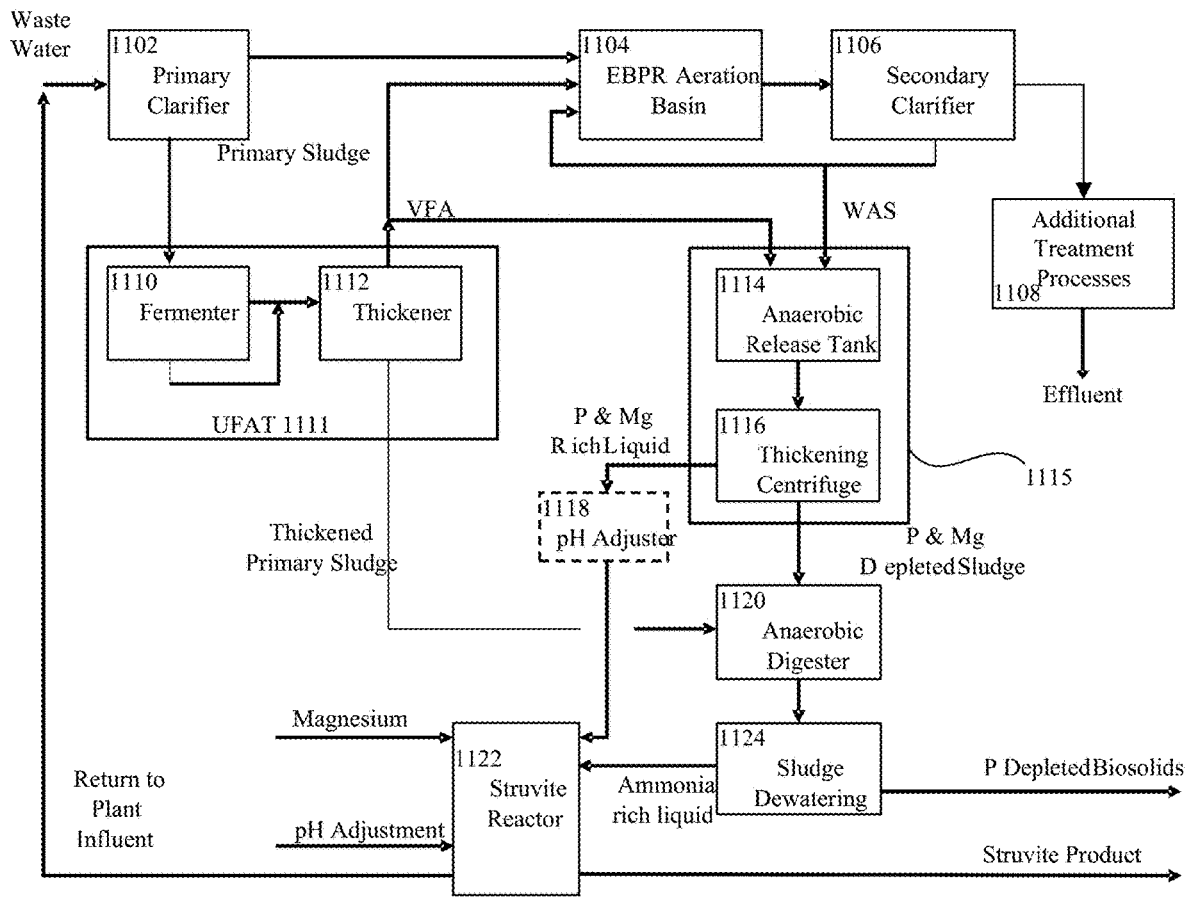
FIG. 11 is a block diagram of a process for early removal of phosphorus and magnesium to aid in recovering phosphorus as struvite and/or preventing struvite formation in waste water treatment facilities by using an anaerobic reactor upstream of anaerobic digestion to release phosphorus and magnesium.

FIG. 11 is a block diagram of an enhanced biological phosphorus removal ("EBPR") waste water treatment system. Waste water is input to a primary clarifier 1102, which provides a first output to an enhanced biological phosphorus removal capable aeration basin 1104, and a second output to a fermenter 1110. EBPR aeration basin 1104 provides an output coupled to a secondary clarifier 1106. The secondary clarifier has a first output coupled to an additional treatment process block 1108, and a second WAS output coupled to an anaerobic release tank 1114, and the EBPR aeration basin 1104. The additional treatment block 1108 provides an effluent output.

Unified Fermentation and Thickening ("UFAT") 1111 includes a fermenter 1110 and a thickener 1112. The fermenter 1110 output is coupled to a thickener 1112, having a first output coupled to the EBPR aeration basin, a second output coupled to the Anaerobic release tank 1114, a third output of thickened primary sludge, coupled to the anaerobic digester 1120.

Block 1115 includes an anaerobic release tank 1114, and a thickening centrifuge 1116. Output from the Anaerobic release tank 1114 is coupled to the thickening centrifuge 1116. Thickening centrifuge 1116 has a first output coupled to an anaerobic digester, and a second output coupled to a pH adjuster 1118. PH adjuster 1118 has an output coupled to struvite reactor 1122.

Anaerobic digester 1120 has an output coupled to a sludge dewatering block 1124. Sludge dewatering block 1124 has a first output of phosphorous depleted solids, and a second output of ammonia rich liquid coupled to a struvite reactor 1122.

Struvite reactor 1122 can include inputs for magnesium, and pH adjustments. Struvite reactor 1122 includes a first output of struvite product, and a second output of effluent that is returned to the plant input.

Primary clarifier 1102 is conventionally constructed.

EBPR aeration basin 1104 is conventionally constructed.

Secondary clarifier 1106 is conventionally constructed.

Additional treatment block 1108 is conventionally constructed.

Fermenter 1110 is conventionally constructed.

Thickener 1112 is conventionally constructed.

Anaerobic release tank 1114 is conventionally constructed.

Thickening centrifuge 1116 is conventionally constructed.

PH adjuster 1118 is conventionally constructed.

Anaerobic digester 1120 is conventionally constructed.

Sludge dewatering block 1124 is conventionally constructed.

Struvite reactor 1122 is conventionally constructed.

Figure 12:
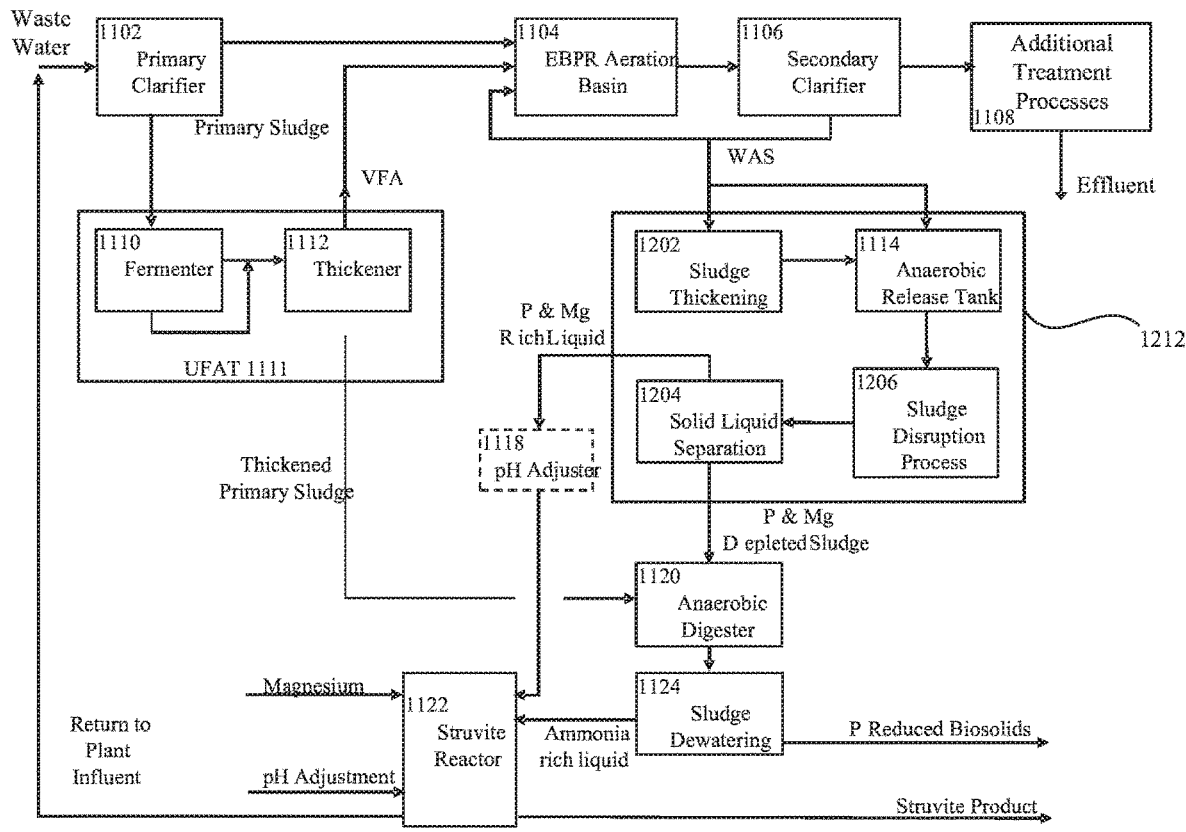
FIG. 12 is a block diagram of a waste water treatment system that includes an emancipating process (sludge disruptive process) that subjects the sludge to any type or form of force, energy, or chemical agent that has the effect of liberating soluble material from the sludge particles to increase the amount of phosphorus and magnesium removed.

FIG. 12 is a block diagram of a waste water treatment system including additional elements of sludge thickening 1202, sludge disruption 1206 and solid liquid separation 1204. This example is constructed as described in FIG. 11, with block 1115 replaced by block 1212. Block 1212 has a sludge thickening device 1202 and an anaerobic release tank 1114, both accepting WAS inputs. The output of sludge thickening device 1202 is coupled to the anaerobic release tank 1114. The output of the anaerobic release tank 1114 is coupled to the sludge disruption process 1206, and the output of the sludge disruption process 1206 is coupled to the solid liquid separation block 1204. The solid liquid separation block 1204 has a first output coupled to the pH adjuster and a second output coupled to the anaerobic digester 1129.

Sludge thickening block 1202 is conventionally constructed.

Anaerobic release tank 1114 is conventionally constructed.

Sludge disruption process 1206 is conventionally constructed

Solid to liquid separation block 1204 is conventionally constructed.

Figure 13:
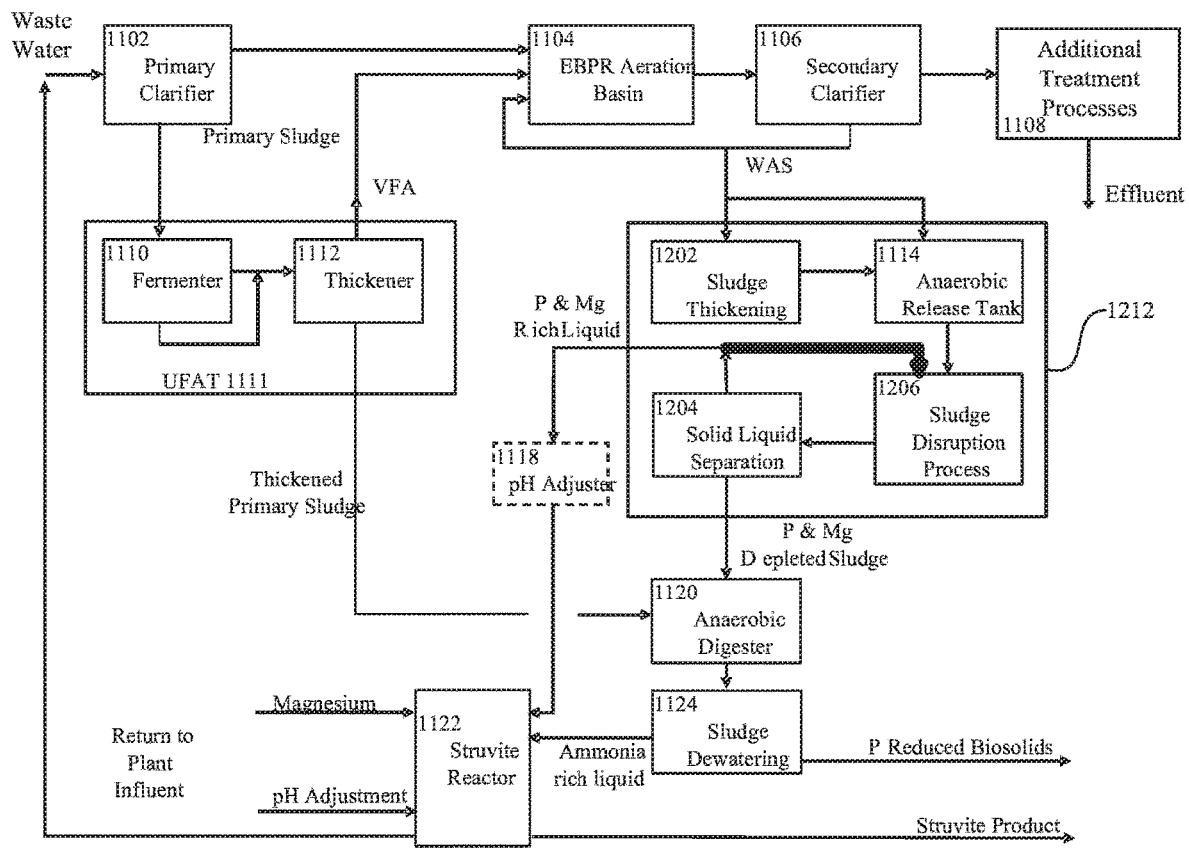
FIG. 13 is a block diagram of a first example of a waste water treatment system including additional elements of sludge thickening, sludge disruption, recycle elutriation flow, and solid liquid separation.

FIG. 13 is a block diagram of a first alternative example of a waste water treatment system including additional elements of sludge thickening, sludge disruption and solid liquid separation. This example is constructed as described in FIG. 12, with the addition of the liquid output of the solid liquid separation block 1204 that feeds the pH adjuster, also being fed to the sludge disruption process 1206.

Figure 14:
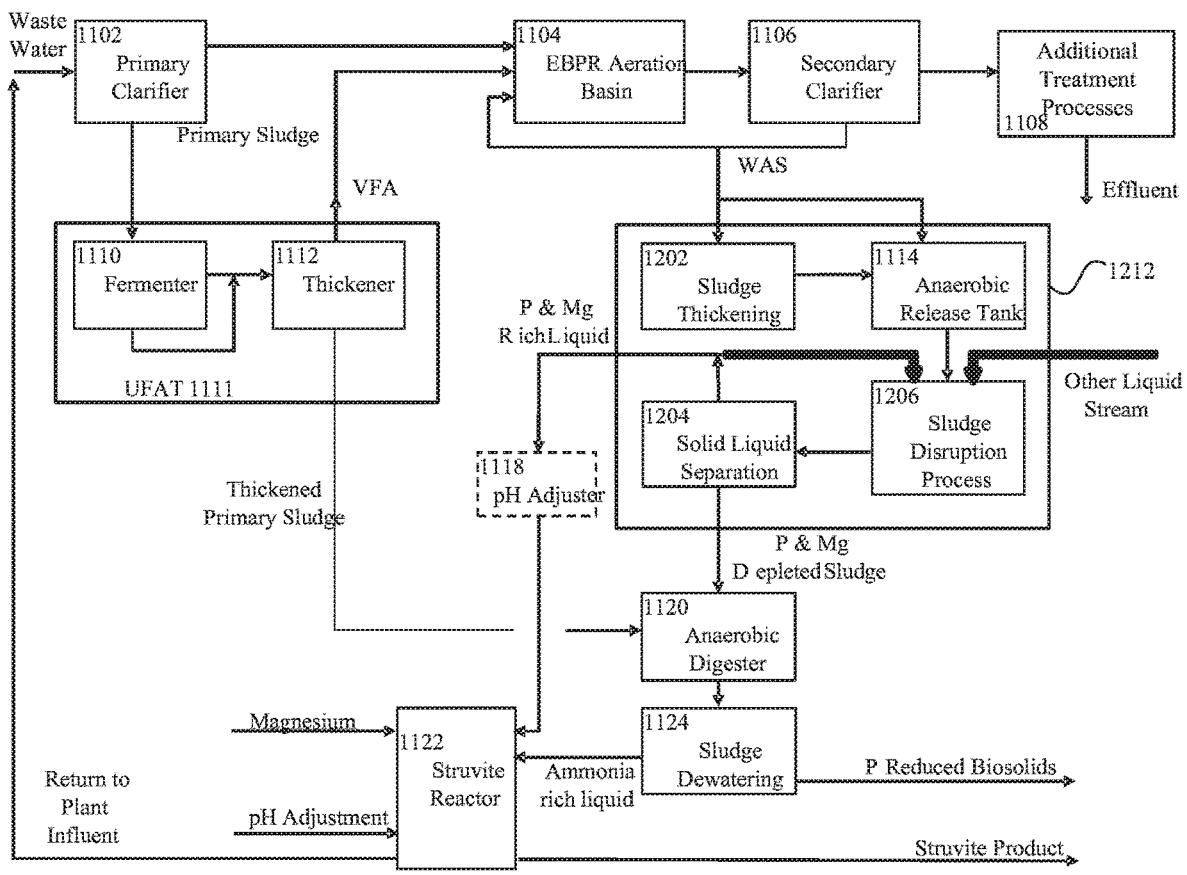
FIG. 14 is a block diagram of a second alternative example of a waste water treatment system including additional elements of sludge thickening, sludge disruption, recycle elutriation or other elutriation liquid flow, and solid liquid separation.

FIG. 14 is a block diagram of a second alternative example of a waste water treatment system including additional elements of sludge thickening, sludge disruption and solid liquid separation. This example is constructed as described in FIG. 13, with the addition of other liquid streams being coupled to the sludge disruption process 1206.

Figure 15:
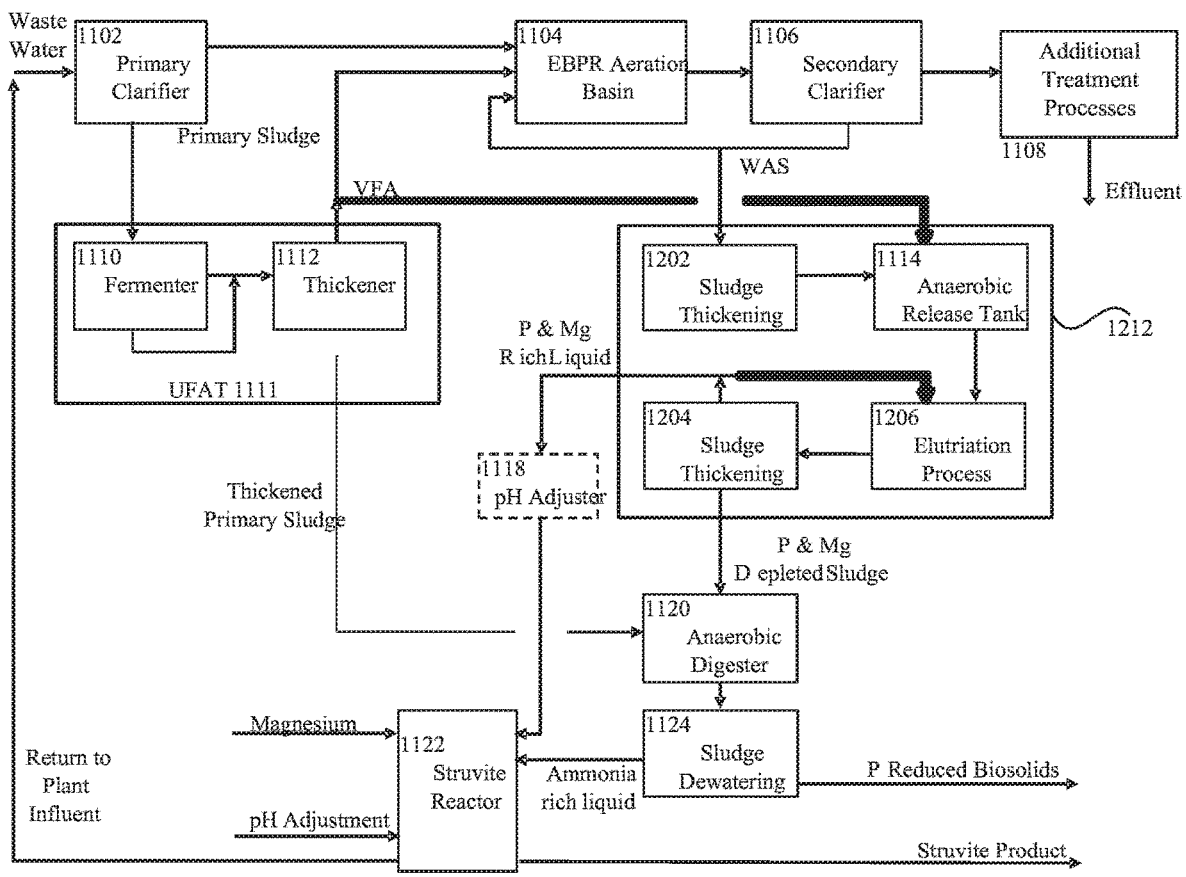
FIG. 15 is a block diagram of a third alternative example of a waste water treatment system including additional elements of sludge thickening, external VFA addition, sludge disruption, and solid liquid separation.

FIG. 15 is a block diagram of a third alternative example of a waste water treatment system including additional elements of sludge thickening, sludge disruption and solid liquid separation. This example is constructed as described in FIG. 13, with the addition of the output of thickener 1112 being coupled to the anaerobic release tank 1114.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A waste treatment process, comprising:
producing a first mixture of solids, microorganisms and liquid from waste water, in which the microorganisms contain phosphorus and magnesium;
removing phosphorus and magnesium from the microorganisms in an anaerobic reactor and permitting the removed phosphorus and magnesium to dissolve in a liquid portion of the first mixture producing stripped thickened waste activated sludge;
further releasing phosphorus and magnesium from the stripped thickened waste activated sludge by emancipation to produce an output;
thickening the output to produce a phosphorous and magnesium depleted first thickener output, and a phosphorus rich and magnesium rich second thickener output is separated from a remaining phosphorus-reduced and magnesium-reduced mixture;
fermenting the phosphorous and magnesium depleted first thickener output;
feeding back a portion of the phosphorous and magnesium depleted first thickener output emancipate the stripped thickened waste activated sludge;
further anaerobic treating of the phosphorous and magnesium depleted first thickener output creating an ammonia-rich, phosphorus-reduced and magnesium-reduced mixture;
dewatering the ammonia-rich mixture to produce ammonia-rich liquid; and
mixing the ammonia-rich liquid with the phosphorus rich and magnesium-rich liquid to produce struvite.

2. The waste treatment process of claim 1, further comprising thickening the first mixture.

3. The waste treatment process of claim 1, further comprising adding readily biodegradable carbon compounds (RBCs) to said first mixture.

4. The waste treatment process of claim 1, in which emancipation is the application of force to the stripped thickened waste activated sludge to further release releasing phosphorus and magnesium from the stripped thickened waste activated sludge.

5. The waste treatment process of claim 1, in which emancipation is the application of energy to the stripped thickened waste activated sludge to further release releasing phosphorus and magnesium from the stripped thickened waste activated sludge.

6. The waste treatment process of claim 1, in which emancipation is the application of a chemical agent to the stripped thickened waste activated sludge to further release releasing phosphorus and magnesium from the stripped thickened waste activated sludge.

7. The waste treatment process of claim 1, in which emancipation is the application of energy to the stripped thickened waste activated sludge to further release releasing phosphorus and magnesium from the stripped thickened waste activated sludge.

8. A method of waste treatment comprising:
inputting waste activated sludge to an anaerobic reactor;
inducing endogenous respiration in the anaerobic rector to produce a stripped and thickened waste activated sludge;
emancipatively processing the stripped and thickened waste activated sludge to produce an output;
thickening the output produce a phosphorous and magnesium depleted twice thickened waste activated sludge, and a magnesium and phosphorous rich liquid;
anaerobically digesting the phosphorous and magnesium depleted twice thickened waste activated sludge;
dewatering the anaerobically digested phosphorous and magnesium depleted twice thickened waste activated sludge to produce bio-solids and an ammonia rich liquid; and
producing struvite from the ammonia rich liquid and the magnesium and phosphorous rich liquid.

9. The method of waste treatment of claim 8 in which endogenous respiration is induced by adding RBCs to the anaerobic reactor.

10. The method of waste treatment of claim 8 in which the waste activated sludge is held for a minimum of 0.5 hours.

11. The method of waste treatment of claim 10 in which the RBCs are VFAs.

12. The method of waste treatment of claim 11 in which 5-8 grams of VFAs are added per gram of planned phosphorous release.

13. The method of waste treatment of claim 8 in which Inducing endogenous respiration is by internal fermentation of the waste activated sludge in the anaerobic reactor.

14. The method of waste treatment of claim 13 in which endogenous respiration is achieved by holding the waste activated sludge for 36 to 96 hours.

15. The method of waste treatment of claim 8 in which emancipatively processing utilizes plant water.

16. The method of waste treatment of claim 8 in which emancipatively processing utilizes mixing.

17. The method of waste treatment of claim 8 in which emancipatively processing utilizes lysing.

18. The method of waste treatment of claim 8 in which emancipation is the application of energy to the stripped thickened waste activated sludge to further release releasing phosphorus and magnesium from the stripped thickened waste activated sludge.

19. The method of waste treatment of claim 8 further comprising thickening waste activated sludge prior to inputting to an anaerobic reactor.

20. The method of waste treatment of claim 8 in which a portion of the magnesium and phosphorous rich liquid is fed back for emancipation.

* * * * *